United States Patent
Shibuya et al.

(10) Patent No.: US 10,969,400 B2
(45) Date of Patent: Apr. 6, 2021

(54) SEMICONDUCTOR DEVICE, ANGLE VALUE CORRECTION CIRCUIT AND METHOD THEREFOR

(71) Applicant: Renesas Electronics Corporation, Tokyo (JP)

(72) Inventors: Yoshitaka Shibuya, Tokyo (JP); Hayato Kimura, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 272 days.

(21) Appl. No.: 16/116,668

(22) Filed: Aug. 29, 2018

(65) Prior Publication Data
US 2019/0137535 A1 May 9, 2019

(30) Foreign Application Priority Data
Nov. 9, 2017 (JP) .................. 2017-216145

(51) Int. Cl.
*G01P 3/44* (2006.01)
*H02P 23/14* (2006.01)
(Continued)

(52) U.S. Cl.
CPC .................. *G01P 3/44* (2013.01); *G01D 3/02* (2013.01); *G01D 5/204* (2013.01);
(Continued)

(58) Field of Classification Search
CPC . G01P 3/44; G01D 5/204; H02P 23/14; H02P 6/16; H02P 6/06
See application file for complete search history.

(56) References Cited

U.S. PATENT DOCUMENTS

| 8,487,563 B2 | 7/2013 | Kawakami et al. |
| 2004/0150359 A1 | 8/2004 | Yaguchi et al. |
| (Continued) | | |

FOREIGN PATENT DOCUMENTS

JP   2012-029547 A   2/2012

OTHER PUBLICATIONS

Extended European Search Report dated Mar. 18, 2019 for European Patent Application No. 18194400.0-1022.

*Primary Examiner* — Toan M Le
(74) *Attorney, Agent, or Firm* — McDermott Will & Emery LLP (57) ABSTRACT

In order to correct the rotation angle value without an increase in the circuit size, a rotation period measurement unit measures a rotation period of a rotary shaft in which a rotation angle is detected by using a resolver that outputs a signal corresponding to the rotation angle of the rotary shaft. A rotation speed calculation unit calculates the rotation speed of the rotary shaft based on the rotation period. An acceleration calculation unit calculates the rate of change of the rotation speed per interval when a given rotation angle of the rotary shaft is divided into $2^{n+1}$ intervals, in which n is an integer of 1 or more. An estimated angle calculation unit calculates the rotation angle estimation value, assuming that the rotary shaft performs a uniform acceleration motion, based on the rotation speed and the rate of change of the rotation speed. A correction value calculation unit calculates the correction value of the rotation angle value converted from the output signal of the resolver. A correction value application unit generates a corrected angle value by applying the correction value to the rotation angle value.

16 Claims, 7 Drawing Sheets

(51) Int. Cl.
*H02P 6/16* (2016.01)
*H02P 6/06* (2006.01)
*G01D 5/20* (2006.01)
*G01D 3/02* (2006.01)
*G01D 5/244* (2006.01)

(52) U.S. Cl.
CPC ........... *G01D 5/24495* (2013.01); *H02P 6/06* (2013.01); *H02P 6/16* (2013.01); *H02P 23/14* (2013.01)

(56) References Cited

U.S. PATENT DOCUMENTS

| | | |
|---|---|---|
| 2010/0321006 A1 | 12/2010 | Suzuki |
| 2011/0029178 A1 | 2/2011 | Kawakami et al. |
| 2012/0112672 A1* | 5/2012 | Niimi ................ G01D 5/24476 318/400.04 |

* cited by examiner

SEMICONDUCTOR DEVICE, ANGLE VALUE CORRECTION CIRCUIT AND METHOD THEREFOR

CROSS-REFERENCE TO RELATED APPLICATIONS

The disclosure of Japanese Patent Application No. 2017-216145 filed on Nov. 9, 2017 including the specification, drawings and abstract is incorporated herein by reference in its entirety.

BACKGROUND

The present invention relates to a semiconductor device and an angle value correction circuit. Particularly, the present invention relates to, for example, a semiconductor device having a function for correcting the rotation angle value, for example, based on an output signal of a resolver, as well as an angle value correction circuit.

Further, the present invention relates to an angle value correction method. Particularly, the present invention relates to, for example, an angle value correction method that corrects the rotation angle value.

Patent Document 1 (Japanese Unexamined Patent Application Publication No. 2012-029547) discloses a motor control device for vehicle running. This motor control device for vehicle running includes an error correction unit that corrects the error of the angle detected by a resolver which is a motor rotation angle detection means. The error correction unit performs a correction process for estimating the true angle (hereafter also referred to as the estimated angle) with no error from a past rotation period of the motor to approximate the actually detected angle (hereinafter also referred to as the actual angle) that is output from the resolver, to the estimated angle.

The estimated angle changes linearly with respect to time when the motor uniformly rotates at a constant rotation speed. On the other hand, the estimated angle changes in curves with respect to time when the motor accelerates or decelerates. In order to calculate the estimated angle in curve, the error correction unit calculates the change in time of the rotation period and then calculates the estimated angle by using the calculated the change in time. More specifically, the error correction unit first calculates the linear estimated angle by assuming that the motor rotates at a constant speed. Next, the error correction unit adds a correction value for an increase or decrease in speed according to the change in time of the rotation period, to calculate the estimated angle in curve. In Japanese Unexamined Patent Application Publication No. 2012-029547, a table is prepared in advance that stores correction values for an increase or decrease in speed per change in time of the rotation period. The estimated angle in curve is calculated by using the prepared table.

SUMMARY

However, because a previously prepared table is used in Japanese Unexamined Patent Application Publication No. 2012-029547, the present inventors have found a problem that it is difficult to change the accuracy of correction after the circuit design is completed in the technique disclosed in Japanese Unexamined Patent Application Publication No. 2012-029547.

More specifically, in Japanese Unexamined Patent Application Publication No. 2012-029547, for example, when correction values are stored in the table by 1% change in time of the rotation period and if it is desired to change the table to another one in which correction values are stored by 0.5% change in time of the rotation period, the determination method of the change in time is a problem. There may be two determination methods. One uses a combination circuit for determination generated in advance according to the prepared table. The other method calculates the change in time of the rotation period by using a divider. Of these methods, the method using the combination circuit for determination needs to rebuild the combination circuit for determination when the table is changed. For this reason, in order to make it possible to freely change the size of the table according to the required correction accuracy, it is necessary to adopt the method of using a divider. However, in this case, there arises a problem that the circuit size increase increases.

Other problems and novel features will become apparent from the description of this specification and the accompanying drawings.

According to an embodiment, an angle value correction circuit includes: an acceleration calculation unit that calculates the rate of change of the rotation speed per interval when a given rotation angle of a rotary shaft is divided into $2^{n+1}$ intervals; an estimated angle calculation unit that calculates a rotation angle estimation value by assuming that the rotary shaft performs a uniform acceleration motion; and a correction value application unit that generates a corrected angle value by applying the correction value, which is calculated based on the rotation angle value and the rotation angle estimation value, to the rotation angle value.

According to the above embodiment, it is possible to correct the rotation angle value without an increase in the circuit size.

DETAILED DESCRIPTION

Hereinafter, embodiments using means for solving the above problems will be described in detail with reference to the accompanying drawings. The following descriptions and drawings are appropriately omitted and simplified to clarify the explanation. Further, each of the elements shown in figures as functional blocks for performing various processes can be configured with a CPU (Central Processing Unit), a memory, or other circuits in terms of hardware, and is realized by a program, or the like, loaded into the memory in terms of software. Thus, it should be understood to those skilled in the art that the functional blocks can be implemented in various forms only by hardware, only by software, or by a combination of them, and the implementation method is not limited to one of these forms. It should be noted that the same elements are denoted by the same reference numerals throughout the drawings, and the repetitive description thereof is omitted accordingly.

Further, the above programs can be stored by using various types of non-transitory computer readable media and can be provided to the computer. The non-transitory computer readable media include various types of tangible recording media. Examples of non-transitory recording media include magnetic recording media (for example, flexible disk, magnetic tape, hard disk), magneto-optical recording media (for example, magneto-optical disk), CD-ROM (Read Only Memory) CD-R, CD-R/W, and semiconductor memory (for example, mask ROM, PROM (Programmable ROM), EPROM (Erasable PROM), flash ROM, and RAM (Random Access Memory)). It may also be possible that the programs are provided to the computer by various types of transitory computer readable media. Examples of transitory computer readable media include electric signals, optical signals, and electromagnetic waves. The transitory computer readable media can provide programs to the computer through wired communication paths, such as electric wire and optical fiber, or through a wireless communication path.

In the following embodiments, the invention is described by dividing it into a plurality of sections or embodiments when required as a matter of convenience. However, these sections or embodiments are not irrelevant to each other unless expressly stated otherwise, and one serves as a variation, an application, a detailed description, or a supplementary explanation of a part or the whole of the other. Further, in the following embodiments, when referring to the number of elements (including the number of pieces, numerical value, amount, range, and the like), the number of elements is not limited to a specific number unless expressly stated otherwise and except for cases such as when the number is clearly limited in principle to a specific number. The number of elements can be greater or smaller than the specific number.

Further in the following embodiments, the components (including operation steps and the like) are not necessarily required, unless expressly stated otherwise and except for cases such as when they are considered to be clearly required in principle. Also, in the following embodiments, when referring to the shape, the positional relationship, or other characteristics of the components and the like, those substantially approximate or similar to the shape or other characteristics are included unless expressly stated otherwise and except for cases such as when they are clearly considered not to be in principle. This also applies to the number and the like (including the number of pieces, numerical value, amount, range, and the like) described above.

First Embodiment

Figure 1:
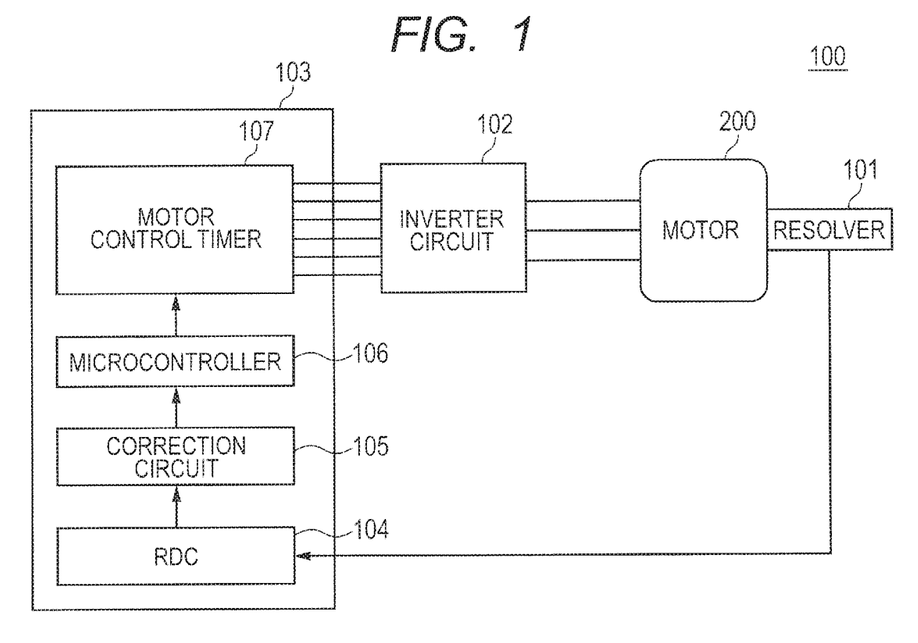
FIG. 1 is a block diagram showing a motor control device including a semiconductor device according to a first embodiment.

FIG. 1 shows a motor control device including a semiconductor device according to a first embodiment. A motor control device 100 includes a resolver 101, an inverter circuit 102, an RDC (Resolver to Digital Converter) 104, a correction circuit 105, a microcontroller 106, and a motor control timer 107. The RDC 104, the correction circuit 105, the microcontroller 106, and the motor control timer 107 are configured, for example, as a semiconductor device 103. The inverter circuit 102, the microcontroller 106, and the motor control timer 107 configure a motor drive control unit.

The motor control device 100 controls the rotational drive of a motor 200. The motor 200 is configured as a synchronous motor such as, for example, a permanent magnet synchronous motor. For example, the motor 200 includes a rotor having permanent magnets with a plurality of poles, as well as a stator having coils of a plurality of phases. The motor 200 is mounted, for example, on a vehicle and used for run drive of the vehicle. The usage and type of the motor 200 is not particularly limited, and for example, the motor 200 can be used for usage other than run drive of the vehicle.

The resolver 101 outputs a signal according to the rotation angle of the rotary shaft of the motor 200. The resolver 101 is an electronic mechanical sensor that can measure the angle position of the rotary shaft of the motor 200. For example, the resolver 101 has a rotor that rotates with the rotary shaft, as well as a stator. The resolver 101 has one primary winding on the rotor side, and two secondary windings on the stator side. The resolver 101 is configured in such a way that a reactance between the rotor and the stator changes according to the rotation angle of the rotor, thus outputting an electrical signal according to the rotation angle of the rotary shaft of the motor 200. The type of the resolver 101 is not particularly limited and a variable reluctance resolver can be used for the resolver 101.

The RDC 104 is an angle value conversion circuit that converts the output signal of the resolver 101 into a rotation angle value that indicates the rotation angle of the rotary shaft of the motor 200. The RDC 104 outputs, for example, a digital value (rotation angle value) that continuously changes from 0 to a predetermined value during the period when the rotary shaft of the motor 200 makes one rotation from a reference rotation angle position. In the following description, it is assumed that the reference rotation angle position is 0 degrees and the rotation angle value is represented by an unsigned integer of 12 bits. The correction circuit (angle value correction circuit) 105 corrects the rotation angle value output from the RDC 104, and then outputs the corrected angle value.

The inverter circuit 102 is coupled to each of a plurality of coils of the stator of the motor 200. The inverter circuit 102 includes, for example, a plurality of insulated gate bipolar transistors (IGBT), and has a plurality of push-pull output circuits, each of which has a drive terminal coupled to the corresponding coil of the stator. The motor control timer 107 controls the energization of each of the different phase coils of the stator through the inverter circuit 102.

The microcontroller 106 controls the rotational drive of the motor 200 by using the corrected angle value corrected by the correction circuit 105. The microcontroller 106 supplies an excitation current, for example, from a coil of one phase to a coil of another phase in the stator of the motor 200. The microcontroller 106 determines the energization phase of the motor 200 according to the corrected angle value and the like input from the correction circuit 105. Then, the microcontroller 106 transmits a control signal to the motor control timer 107. It may also be possible that the microcontroller 106 controls the rotational drive of the motor 200 by determining the number of rotations of the motor 200, for example, by using information obtained from an accelerator sensor, brake sensor, or the like not shown.

[Angle Error]

Figure 2:
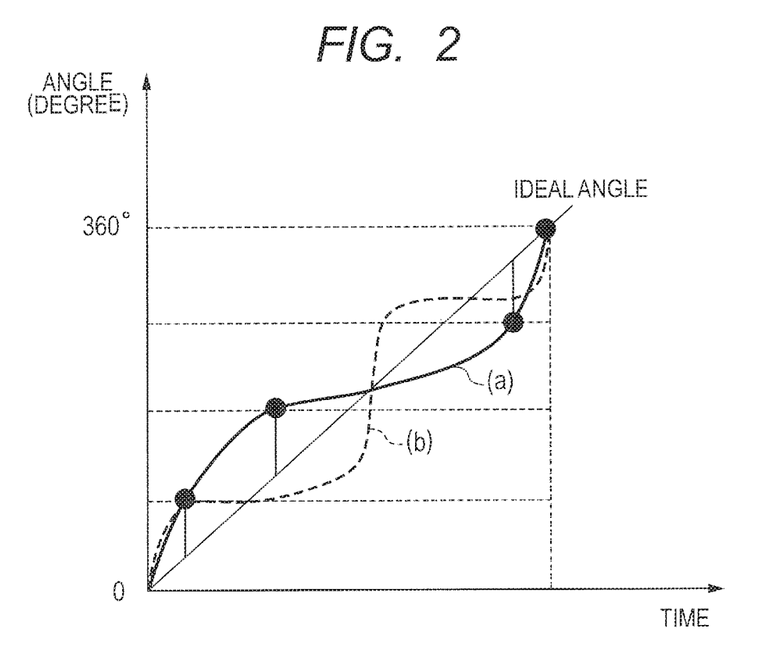
FIG. 2 is a graph showing the rotation angle value output from RDC as well as the ideal angle with no error.

FIG. 2 shows the rotation angle value output from the RDC 104, as well as the ideal angle with no error. In FIG. 2, the graph (a) shows the primary error and the graph (b) shows the secondary error. For example, when the rotary shaft performs a uniform rotary motion at a constant rotation speed, the rotation angle (ideal angle) linearly changes with respect to time. However, when an error with the periodicity of one period with respect to one rotation of the rotary shaft is included in the rotation angle value output from the RDC 104, the rotation angle value does not linearly change with respect to time as shown in the graph (a). Further, when an error with the periodicity of two periods with respect to one rotation of the rotary shaft is included in the rotation angle value output from the RDC 104, the rotation angle value does not linearly change with respect to time as shown in the graph (b).

The correction circuit 105 performs a correction to approximate the rotation angle value (hereinafter also referred to as the actual angle value), which is output from the RDC 104, to the ideal angle value. For example, the correction circuit 105 obtains the difference between the ideal angle (the estimated angle which is an estimation of the ideal angle) and the actual angle value which is the detection value, at a predetermined correction point. Then, the coercion circuit 105 corrects the actual angle value with the difference as the correction value. When correcting the primary error, it is possible to reduce the error of the actual angle value by obtaining the estimated angle and the correction value at least every 90-degree rotation. When correcting the secondary error, it is possible to reduce the error of the actual angle value by obtaining the estimated angle and the correction value every 45 degrees.

In general, it is possible to correct n order errors by obtaining the estimated angle and the correction value every $360°/2^{n+1}$, in which n is positive integer. This means that when the estimated angle is obtained by an angle unit obtained by dividing 360 degrees by a power of 2, the maximum value of n of n order errors that can be corrected is uniquely determined. By taking advantage of this nature, the present embodiment obtains the rotation angle estimation value by unit of the angle obtained by dividing 360 degrees by a power of 2, and then obtains the difference between the estimated value and the actual angle value as the correction value.

[Correction Circuit]

Figure 3:
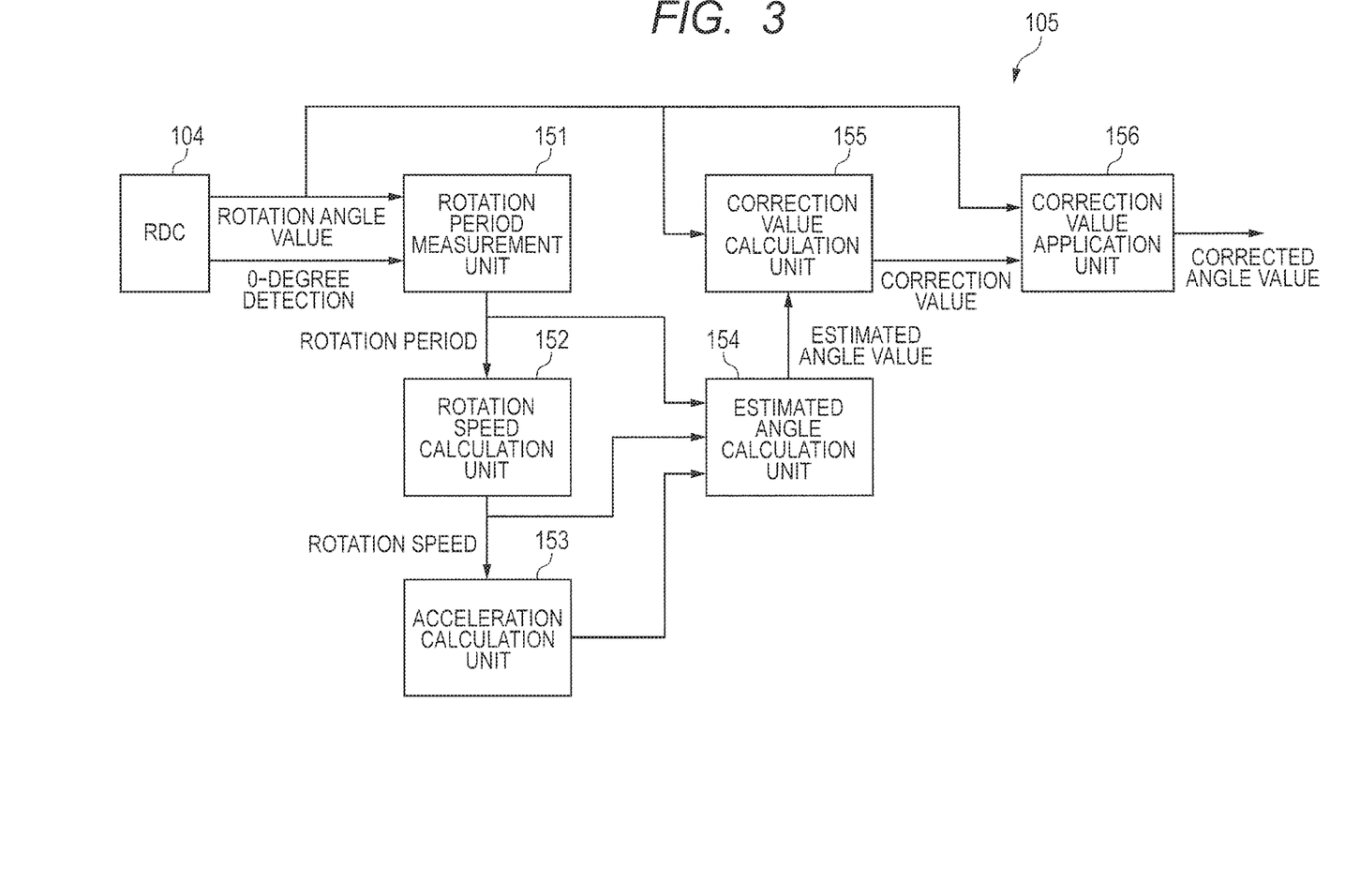
FIG. 3 is a block diagram showing a configuration example of a correction circuit.

FIG. 3 shows a configuration example of the correction circuit 105. The correction circuit 105 includes a rotation period measurement unit 151, a rotation speed calculation unit 152, an acceleration calculation unit 153, an estimated angle calculation unit 154, a correction value calculation unit 155, and a correction value application unit 156. The rotation period measurement unit 151 inputs the rotation angle value (actual angle value) as well as the 0 degree detection signal indicating that the rotation angle is in the original position, from the RDC 104. The rotation period measurement unit 151 measures the rotation period of the rotary shaft of the motor 200. The rotation period measurement unit 151 measures the time required for the rotary shaft to rotate by a given rotation angle.

The rotation period measurement unit 151 measures the time, for example, from when the 0 degree detection signal is input from the RDC 104 to when the next 0 degree detection signal is input. Then, the rotation period measurement unit 151 calculates the time required for the rotary shaft to rotate 360 degrees (one period), as the rotation period. The rotation period measurement unit 151 includes a counter that operates, for example, based on a clock signal of a predetermined frequency. The count value of the counter corresponds to the time.

The rotation speed calculation unit 152 calculates the rotation speed of the rotary shaft of the motor 200 based on the rotation period measured by the rotation period measurement unit 151. For example, the rotation speed calculation unit 152 calculates the rotation speed each time the rotary shaft makes one rotation. The acceleration calculation unit 153 calculates the rate of change of the rotation speed per interval when a given rotation angle of the rotary shaft is divided into $2^{n+1}$ intervals, based on the rotation speed calculated by the rotation speed calculation unit 152. In the following description, it is assumed that the given rotation angle is 360 degrees (one rotation). Further, for the sake of convenience, the rate of change of the rotation speed per interval is also referred to as the acceleration.

[Rate of Change of the Rotation Speed (Acceleration)]

Figure 4:
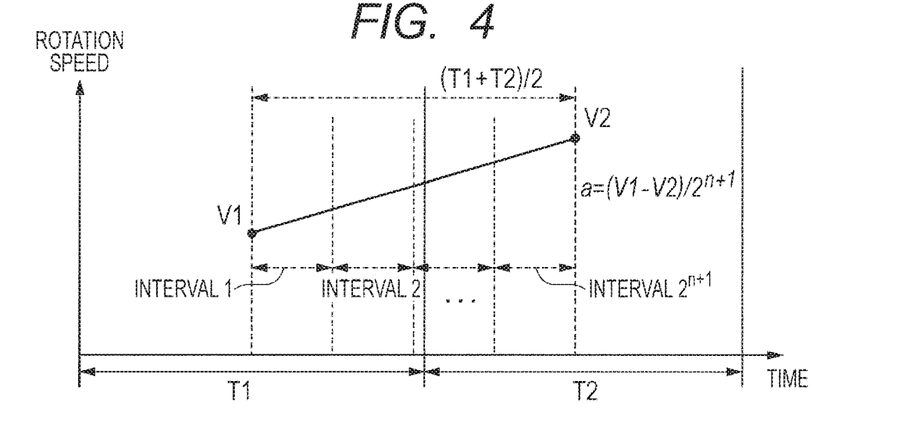
FIG. 4 is a graph showing the change in the rotation speed when the rotary shaft makes two rotations.

FIG. 4 shows the changes in the rotation speed during the period when the rotary shaft makes two rotations. In FIG. 4, the vertical axis represents the rotation speed and the horizontal axis represents the time. For example, of the periods measured by the rotation period measurement unit 151, the first rotation period is assumed to be T1 and the second rotation period is assumed to be T2. It is assumed that the rotary shaft of the motor 200 performs a uniform acceleration motion, namely, the rotation speed is accelerated or decelerated at a constant rate in each period. In this case, the rotation speed in the middle of each period is equal to the average speed of each period. When the rotation angle value is represented by a value between 0 and 4095, the rotation speed V1 in the first period is calculated as follows: V1=4096/T1, and the rotation speed V2 in the second period is calculated as follows: V2=4096/T2. The acceleration calculation unit 153 calculates the acceleration based on the rotation speed in the last period as well as the rotation speed in the previous period, for example, each time the rotary shaft of the motor 200 makes one rotation.

Here, the "acceleration" is the physical amount that indicates the rate of change of the speed per unit time, which can be obtained as the ratio of the speed change amount to the speed change time. In the example of FIG. 4, the acceleration can be obtained as follows: (V2−V1)/{(T1+T2)/2}. In the present embodiment, the rate of change of the rotation speed per interval is obtained as the acceleration in which one interval is $360°/2^{n+1}$, assuming that the speed changes from V1 to V2 during the period when the rotary shaft makes one rotation, instead of the rate of change in speed per unit time. More specifically, $a=(V2-V1)/2^{n+1}$ is obtained as the acceleration.

Returning to FIG. 3, the rotation period measurement unit 151 measures the time from when the 0 degree detection signal is input from the RDC 104 to when the actual angle value is the value corresponding to k multiple of $360°/2^{n+1}$, in which k is an integer from 1 to $2^{n+1}$. The estimated angle calculation unit 154 calculates the rotation angle estimation value (estimated angle value) which is the estimated value of the rotation angle of the rotary shaft, assuming that the rotary shaft performs a uniform acceleration motion, based on the rotation speed of the rotary shaft as well as the acceleration described above. The estimated angle calculation unit 154 calculates the rotation angle estimation value, for example, at the time (point) at which the actual value is the value corresponding to an integer multiple of the angle obtained by dividing 360 degrees by $2^{n+1}$.

The correction value calculation unit 155 calculates the correction value of the rotation angle value, based on the actual angle value output by the RDC 104 as well as the rotation angle estimation value calculated by the estimated angle calculation unit 154. For example, the correction value calculation unit 155 calculates the difference between the actual value and the rotation angle estimation value as the correction value at the time when the actual angle value is the value corresponding to an integer multiple of the angle obtained by dividing 360 degrees by $2^{n+1}$. The correction value application unit 156 generates a corrected angle value by applying the correction value calculated by the correction value calculation unit 155 to the actual angle value output by the RDC 104.

[Operation Timing]

Figure 5:
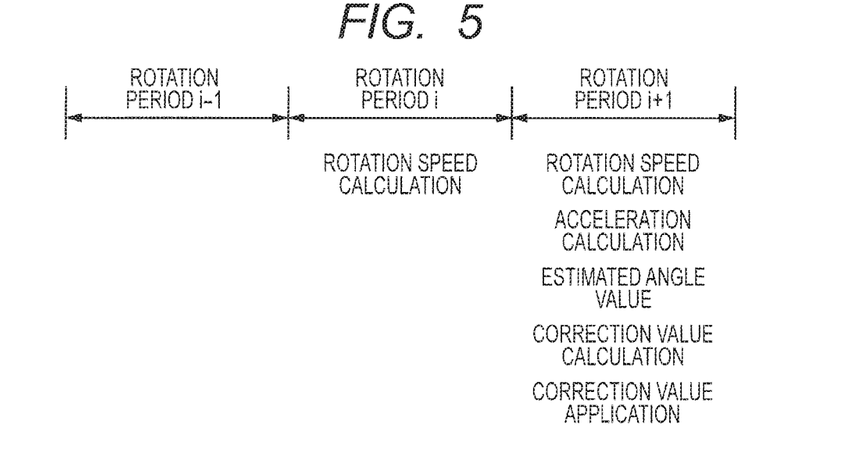
FIG. 5 is a timing chart showing the calculation timing in the correction circuit.

FIG. 5 shows the operation timing in the correction circuit. In FIG. 5, i is an integer of two or more indicating the number of the rotation period corresponding to one rotation of the rotary shaft. When the i−1th period is completed, the rotation period measurement unit 151 measures the time from the start time of the i−1th period to the end time as the rotation period. Then, the rotation speed calculation unit 152 calculates the rotation speed of the i−1th period, based on the measured rotation period. Similarly, with respect to the ith period, the rotation period measurement unit 151 calculates the rotation period of the ith period and then the rotation speed calculation unit 152 calculates the rotation speed $V_i$ of the ith period.

When the rotation speed $V_i$ of the ith period is calculated, the acceleration calculation unit 153 calculates the acceleration $a_i$ in the ith period based on the difference between the rotation speed of the i−1th period and the rotation speed $V_i$ of the ith period. More specifically, the acceleration calculation unit 153 calculates the acceleration $a_i$ by the following equation:

$$a_i=(V_i-V_{i-1})/2^{n+1}$$

The estimated angle calculation unit 154 calculates the rotation angle estimation value at the time when the rotation angle value (actual angle value) is the value corresponding to an integer multiple of the angle obtained by dividing 360 degrees by $2^{n+1}$, by using the formula of uniform acceleration motion, assuming that the rotary shaft performs a uniform acceleration motion at the acceleration $a_i$ that is calculated by the calculation unit 153. For example, by assuming that k is an integer from 1 to $2^{n+1}$ corresponding to the number of each dividing interval, $t_i(k)$ is the time required for the rotation angle value to reach the value corresponding to $(360°/2^{n+1})×k$ from the initial value, the estimated angle calculation unit 154 calculates the rotation angle estimation value $Y_i(k)$ at the time when the actual angle value is k multiple of $360°/2^{n+1}$ in the ith period, by the following equation:

$$Y_i(k)=V_i×t_i(k)+(½)×a_i×t_i(k)×(k-2^{n+1})$$

The correction value calculation unit 155 calculates the difference between the rotation angle estimation value $Y_i(k)$ calculated by the estimation angle calculation unit 154 and the actual value, as the correction value. More specifically, the correction value calculation unit 155 calculates the correction value $S_i(k)$ at the time when the actual angle value is the value corresponding to the rotation angle $(360°/2^{n+1})×k$ in the ith period, by the following equation:

$$S_i(k)=[\text{the value corresponding to } (360°/2^{n+1})×k]-Y_i(k)$$

The calculation of the correction value $S_i(k)$ is performed after the ith period is completed. The correction value application unit 156 generates the corrected angle value by applying the correction value $S_i(k)$ calculated with respect to the ith period to the actual angle value obtained in the i+1th period. The correction value application unit 156 may start applying the correction value when the correction value $S_i(k)$ is calculated, without applying the correction value until the correction value $S_i(k)$ is calculated, after the completion of the ith period. When the i+1th period is completed, similar to the case of the ith period, the calculation of the rotation speed $V_{i+1}$, the calculation of the acceleration $a_{i+1}$, the calculation of the rotation angle estimation value $Y_{i+1}(k)$, and the calculation of the correction value $S_{i+1}(k)$ are performed. The obtained correction value $S_{i+1}(k)$ is applied to the actual angle value in the i+2th period.

[Acceleration Calculation Unit]

Figure 6:
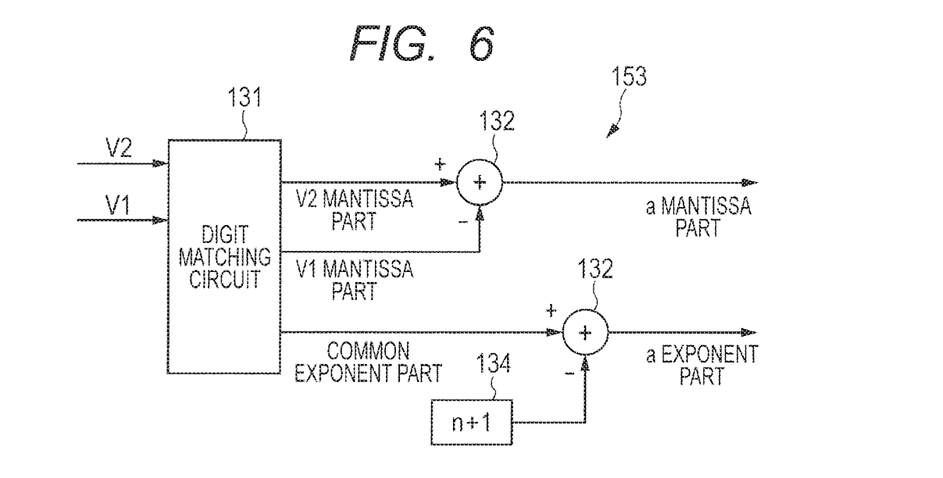
FIG. 6 is a block diagram showing a configuration example of an acceleration calculation unit.

When the calculation of the acceleration is performed in the circuit, it is possible to perform the calculation of the division part without using a divider. FIG. 6 shows a configuration example of the acceleration calculation unit 153. The acceleration calculation unit 153 includes a digit matching circuit 131, a subtractor 132, a subtractor 133, and a register 134. Here, it is assumed that each of the rotation speeds V1 and V2 calculated by the rotation speed calculation unit 152 is represented by the floating point format of a predetermined bit number. For example, V1 and V2 are represented in the form of mantissa×$2^{exponent}$.

The digit matching circuit 131 performs the process of matching the exponent parts of V1 and V2 with a common exponent. When matching the component parts, the digit matching circuit 131 outputs the mantissa of V1, the mantissa of V2, and the common exponent common to the two sides. The subtractor 132 subtracts the mantissa of V1 from the mantissa of V2 output from the digit matching circuit 131. The subtractor 133 subtracts the value stored in the register 134 from the common exponent output from the digit matching circuit 131. The value of n+1 is stored in the register 134, and it is possible to obtain the calculation result of $a=(V2-V1)/2^{n+1}$, in which the value subtracted by the subtractor 132 is used as the mantissa and the value subtracted by the subtractor 133 is used as the exponent.

[Calculation of the Rotation Angle Estimation Value and the Correction Value]

Figure 7:
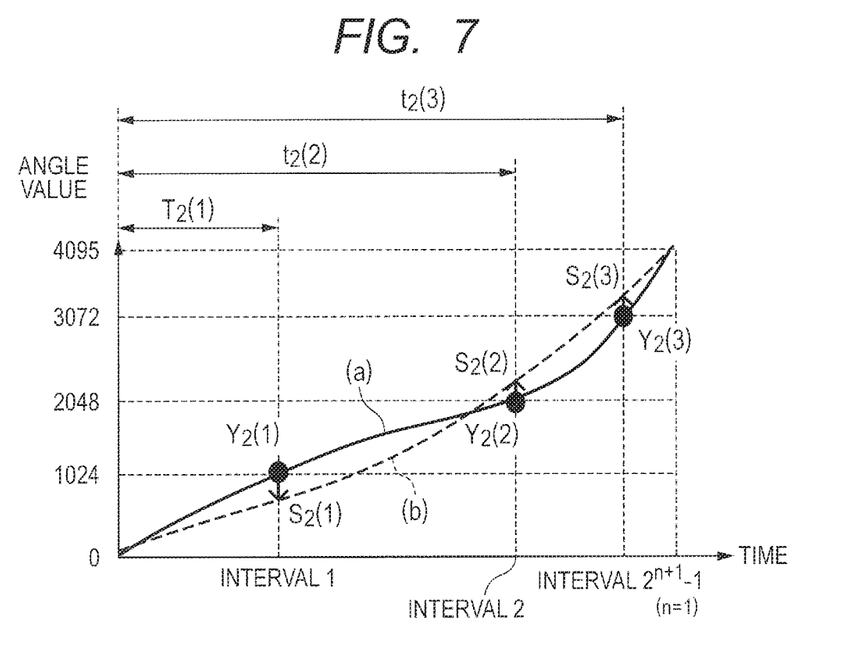
FIG. 7 is a graph showing the actual angle value and the rotation angle estimation value.

FIG. 7 shows the actual angle value and the rotation angle estimation value. In FIG. 7, the graph (a) shows the actual angle value (rotation angle value) output by the RDC 104, and the graph (b) shows the rotation angle estimation value calculated by the estimated angle calculation unit 154. In FIG. 7, the vertical axis represents the value (rotation angle value) corresponding to the rotation angle of the rotary shaft, and the horizontal axis represents the time. In FIG. 7, it is assumed n=1 and that a rotation angle value 1024 corresponds to the rotation angle 360°/4, a rotation angle value 2048 corresponds to the rotation angle (360°/4)×2, and a rotation angle value 3072 corresponds to the rotation angle (360°/4)×3. It is considered that a rotation angle 4095 corresponds to the rotation angle 360 degrees.

The time period shown in FIG. 7 corresponds to the second rotation period (T2). In this period, if the rotary shaft performs a uniform acceleration motion, the rotation angle estimation value changes in proportion to the square of time as shown in the graph (b). Of the rotation angle estimation values that change in proportion to the square of time, the estimated angle calculation unit 154 calculates rotation angle estimation values $Y_2(1)$, $Y_2(2)$, $Y_2(3)$, and $Y_2(4)$ at the time when the actual angle value is an integer multiple of $360°/2^{n+1}$. Note that with respect to the time at which the actual angle value is 360 degrees, the calculation of the rotation angle estimation value can be omitted because, theoretically, the actual angle value and the rotation angle estimation value match each other.

More specifically, the estimated angle calculation unit 154 calculates the rotation angle estimation value $Y_2(1)$ at the time when the actual value is 1024, by the following equation: $Y_2(1)=V2\times t_2(1)+(\frac{1}{2})\times a_2 \times t_2(1)\times(1-4)$. The estimated angle calculation unit 154 calculates the rotation angle estimation value $Y_2(2)$ at the time when the actual angle value is 2048, by the following equation: $Y_2(2)=V2\times t_2(2)+(\frac{1}{2})\times a_2 \times t_2(2)\times(2-4)$. The estimated angle calculation unit 154 calculates the rotation angle estimation value $Y_2(3)$ at the time when the actual angle value is 3072, by the following equation: $Y_2(3)=V2\times t_2(3)+(\frac{1}{2})\times a_2 \times t_2(3)\times(3-4)$.

With respect to the respective times at which the actual value is an integer multiple of $360°/2^{n+1}$, the correction value calculation unit 155 calculates the difference between the actual value and the rotation angle estimation value calculated as described above, as the correction value. More specifically, the correction value calculation unit 155 calculates the correction value $S_2(1)$ at the time when the actual angle value is 1024, by the following equation: $S_2(1)=1024-Y_2(1)$. The correction value calculation unit 155 calculates the correction value $S_2(2)$ at the time when the actual angle value is 2048, by the following equation: $S_2(2)=2048-Y_2(2)$. The correction value calculation unit 155 calculates the correction value $S_2(3)$ at the time when the actual angle value is 3072, by the following equation: $S_2(3)=3072-Y_2(3)$.

[Application of the Correction Value]

Figure 8:
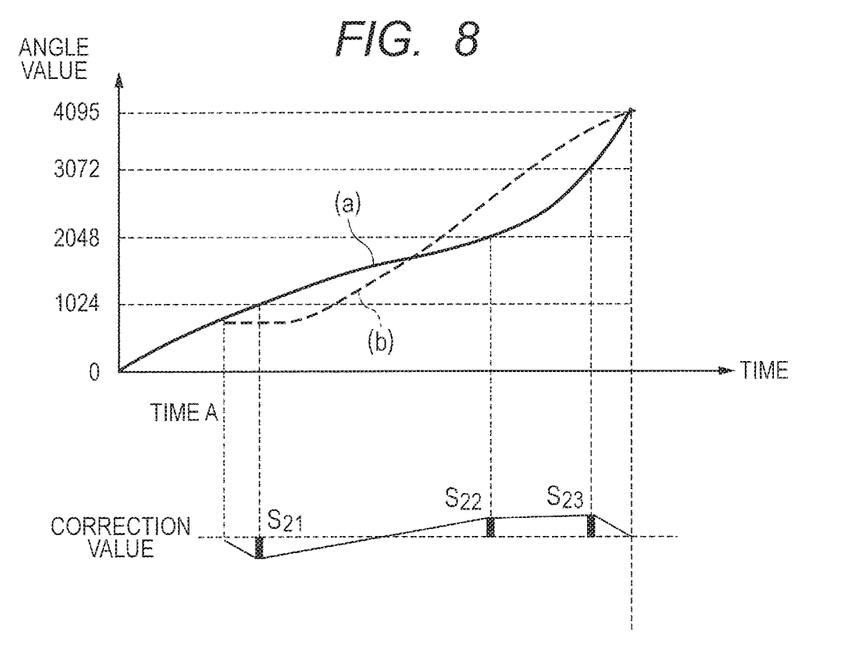
FIG. 8 is a graph showing the actual angle value and the corrected angle value.

FIG. 8 shows the actual angle value and the corrected angle value. Further, the correction value that the correction value application unit 156 applies to is also shown in FIG. 8. The time period shown in FIG. 8 corresponds to the period that follows the period shown in FIG. 7. For example, when the correction value is calculated at time A shown in FIG. 8, the correction value application unit 156 outputs the actual angle value directly to the microcontroller 106 (see FIG. 1), without the application of the correction value from the start of the period until time A. After time A, the correction value application unit 156 outputs the corrected angle value to which the correction value has been applied, to the microcontroller 106.

The correction value application unit 156 applies, for example, $S_2(1)$ to $S_2(3)$ calculated as described above to the actual angle at the time when the actual angle value is an integer multiple of $360°/2^{n+1}$. During the time from when the actual angle value is the value corresponding to the rotation angle $(360°/2^{n+1})\times(k-1)$ to when the actual angle value is the value corresponding to the rotation angle $(360°/2^{n+1})\times k$, the correction value application unit 156 can defined, for example, $S_i(0)=0$ to apply the correction value generated based on the correction values $S_i(k-1)$ and $S_i k$ to the actual angle value. More specifically, during the time when the actual angle value is an integer multiple of the rotation angle $(360°/2^{n+1})$ the correction value application unit 156 can obtain the correction value, for example, by linear interpolation to apply the corrected correction value to the actual value.

[Summary]

In the present embodiment, the acceleration calculation unit 153 calculates the rate of change of the rotation speed with respect to the interval that is determined by dividing one rotation of the rotary shaft by $2^{n+1}$. The estimated angle calculation unit 154 calculates the rotation angle estimation value at the time when the actual angle is an integer multiple of $360°/2^{n+1}$ by using the formula of uniform acceleration motion, assuming that the rotary shaft performs a uniform acceleration motion. Different from Japanese Unexamined Patent Application Publication No. 2012-029547, the present embodiment obtains the estimated angle by calculating the acceleration without using the table. In this way, it is possible to calculate the rotation angle estimation value even if the rotary shaft is accelerated or decelerated in a range not prepared in the table. Further, the present embodiment calculates the acceleration by dividing the difference in the rotation speed by a power of 2, so that there is no need to use the divider in the acceleration calculation part. Thus, it is possible to correct the rotation angle value output by the RDC 104 without an increase in the circuit size. In addition, the control accuracy of the motor 200 can be improved by drive-controlling the motor 200 to the corrected rotation angle value.

Second Embodiment

Figure 9:
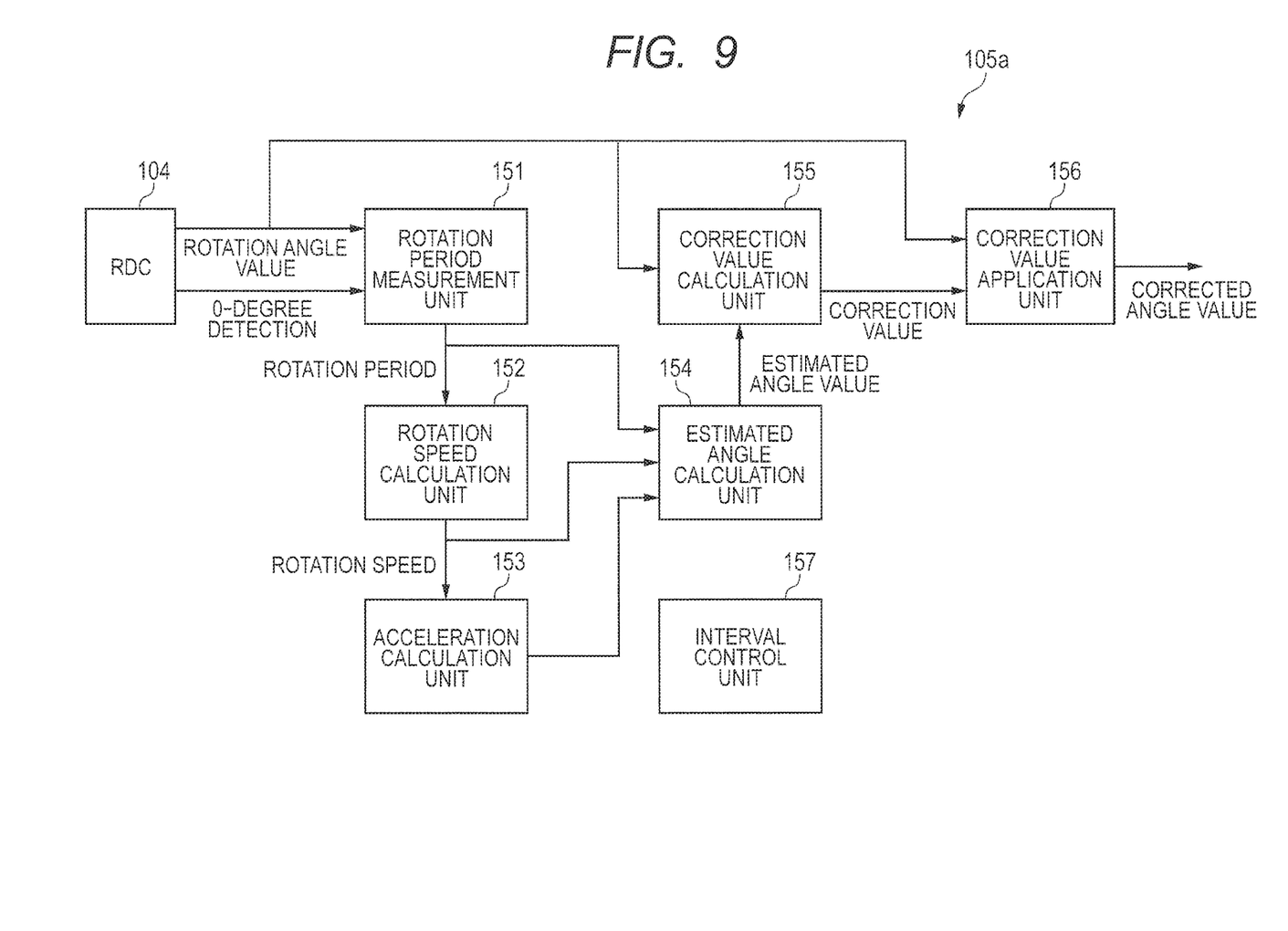
FIG. 9 is a block diagram showing a configuration example of a correction circuit used in a second embodiment.

Next, a second embodiment will be described. FIG. 9 shows a configuration example of a correction circuit used in the present embodiment. A correction circuit 105a used in the present embodiment includes an interval control unit 157, in addition to the components of the correction circuit 105 used in the first embodiment shown in FIG. 3. The interval control unit 157 controls the value of n described above, namely, the number of dividing intervals. In other respects, the correction circuit in the second embodiment may be the same as that in the first embodiment.

In the present embodiment, the interval control unit 157 controls the value of n according to the rotation speed for each rotation period of the rotary shaft of the motor 200 (see FIG. 1). The interval control unit 157 determines whether the rotation speed is "high", "medium", or "low", for example, according to the rotation speed calculated by the rotation speed calculation unit 152, and controls the value of n according to the determination result. The interval control unit 157 increases the accuracy of the correction by increasing the number of time points at which the rotation angle estimation value and the correction value are calculated, in such a way that, for example, the lower the rotation speed the more the value of n is increased. Further, the interval control unit 157 reduces the number of time points at which the rotation angle estimation value and the correction value are calculated, in such a way that, for example, the higher the rotation speed, the more the number of n is reduced.

The interval control unit 157 determines whether the rotation speed is "high", "medium", or "low", for example, by using a threshold A of the rotation speed and using a threshold B greater than the threshold A. When the rotation speed is lower than the threshold A, the interval control unit 157 determines that the rotation speed is "low". When the rotation speed is higher than the threshold A and is lower than the threshold B, the interval control unit 157 determines that the rotation speed is "medium". When the rotation speed is higher than the threshold B, the interval control unit 157 determines that the rotation speed is "high". For example, when the rotation speed is "low", the interval control unit 157 sets the value of n to a certain value n1. When the rotation speed is "medium", the interval control unit 157 sets the value of n to n2 smaller than n1. Further, when the rotation speed is "high", the interval control unit 157 sets the value of n to n3 smaller than n2.

The interval control unit 157 writes the value of n, for example, into a register not shown. The rotation period measurement unit 151 refers to the value stored in the register to measure the time from the start of the period until the actual angle value is the value corresponding to an integer multiple of $360°/2^{n+1}$. The acceleration calculation unit 153 refers to the value stored in the register to calculate the rate of change of the rotation speed per interval when one rotation of the rotary shaft is divided into $2^{n+1}$ intervals. Further, the estimated angle calculation unit 154 refers to the value stored in the register to calculate the rotation angle estimation value at the time (point) at which the actual angle is the value corresponding to an integer multiple of the angle obtained by dividing 360 degrees by $2^{n+1}$. Further, the correction value calculation unit 155 refers to the value stored in the register to calculate the difference between the actual value at the time when the actual value is the value corresponding to an integer multiple of the angle obtained by dividing 360 degrees by $2^{n+1}$, as the correction value.

Operation Example

Figure 10:
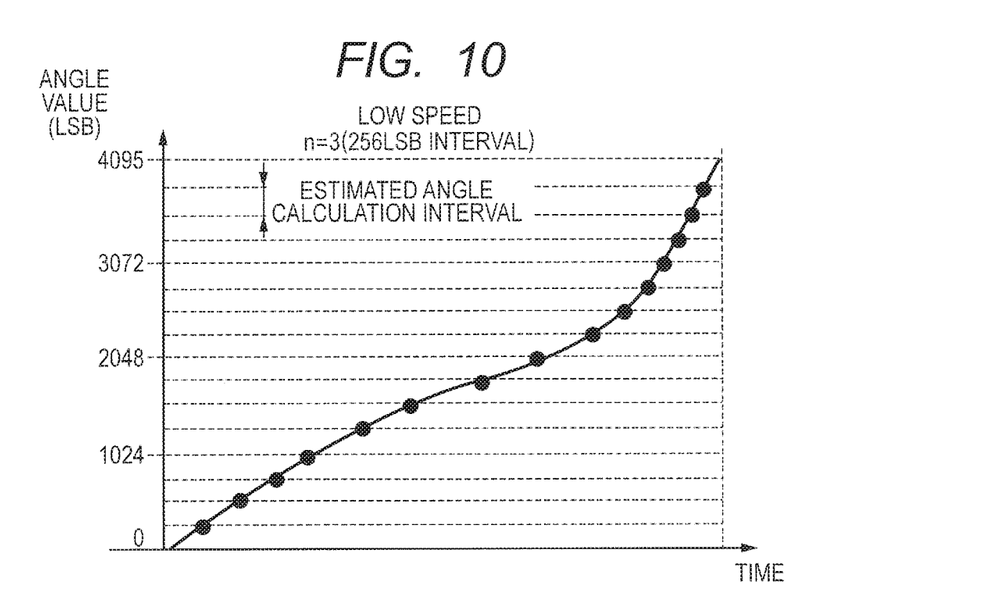
FIG. 10 is a graph showing an example of the interval for calculating the actual angle value and the estimated angle value in a low speed rotation.

FIG. 10 shows an example of the interval at which the actual angle value and the estimated angle value are calculated when the motor rotates at a low speed. In FIG. 10, the vertical axis represents the rotation angle value and the horizontal axis represents the time. In the low speed rotation, the interval control unit 157 sets the value of n, for example, to "3". In this case, the estimated angle calculation unit 154 divides one rotation by $360°/2^4$ to calculate the estimated angle value at the time when the rotation angle value is an integer multiple of the value corresponding to 22.5°, or at the time when the rotation angle value is an integer multiple of 256. In FIG. 10, the time points at which the estimated angle value is calculated are represented by black circles. The correction value calculation unit 155 calculates the correction value at each time point at which the estimated angle value is calculated.

Figure 11:
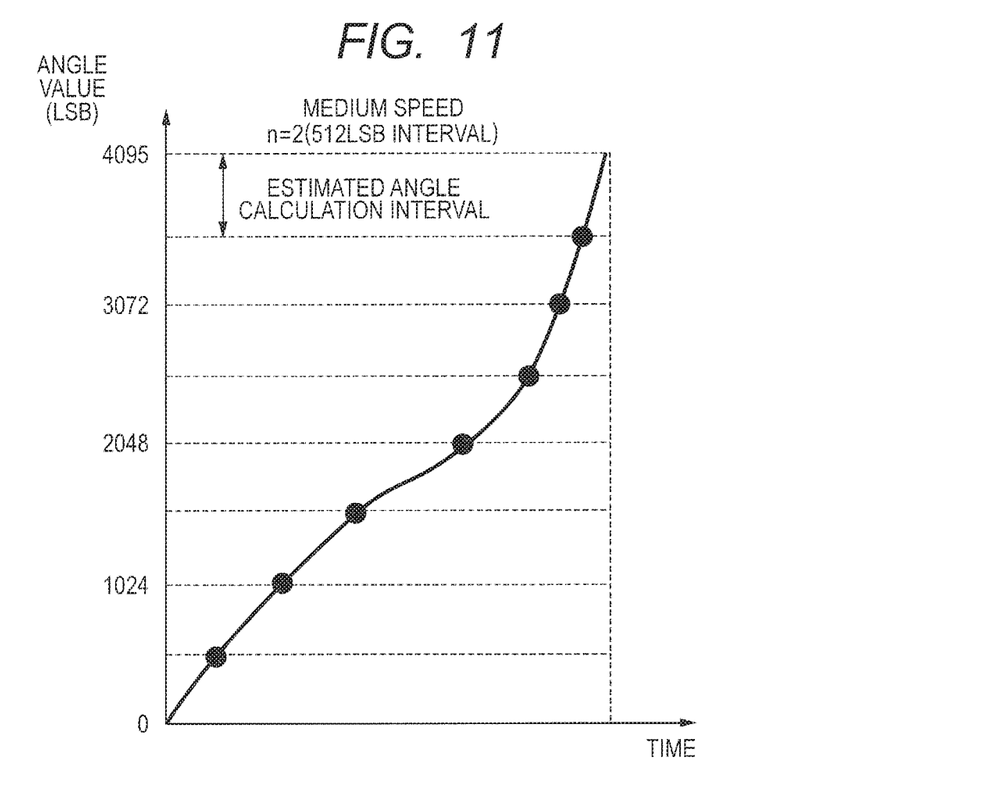
FIG. 11 is a graph showing an example of the interval for calculating the actual angle value and the estimated angle value in a medium speed rotation.

FIG. 11 shows an example of the interval at which the actual value and the estimated angle value are calculated when the motor rotates at medium speed. In FIG. 11, the vertical axis represents the rotation angle value and the horizontal axis represents the time. In the medium speed rotation, the interval control unit 157 sets the value of n, for example, to "2". In this case, the estimated angle calculation unit 154 divides one rotation by $360°/2^3$ to calculate the estimated angle value at the time when the rotation angle value is an integer multiple of the value corresponding to 45 degrees, or at the time when the rotation angle value is an integer multiple of 512. In FIG. 11, the time points at which the estimated angle value is calculated are represented by black circles. The correction value calculation unit 155 calculates the correction value at each time point at which the estimated angle value is calculated. When comparing FIG. 10 and FIG. 11, it can be found that the number of time points at which the correction value is calculated is reduced in the middle speed rotation as compared to that in the low speed operation.

Figure 12:
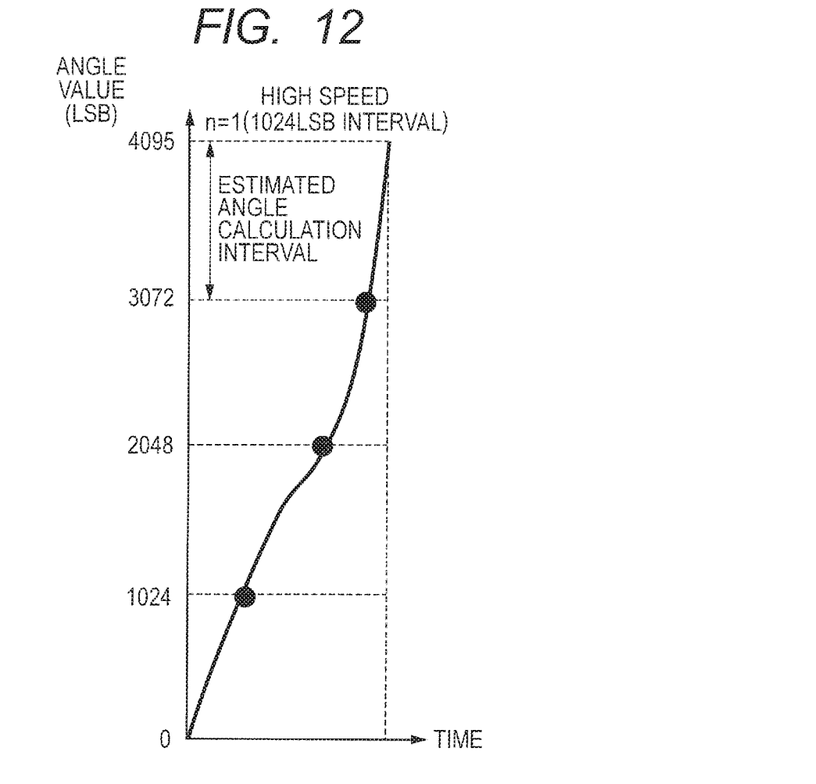
FIG. 12 is a graph showing an example of the interval for calculating the actual angle value and the estimated angle value in a high speed rotation.

FIG. 12 shows an example of the interval at which the actual value and the estimated angle value are calculated when the motor rotates at high speed. In FIG. 12, the vertical axis represents the rotation angle value and the horizontal axis represents the time. In the high speed rotation, the interval control unit 157 sets the value of n, for example, to "1". In this case, the estimated angle value calculation unit 154 divides one rotation by $360°/2^2$ to calculate the estimated angle value at the time when the rotation angle value is an integer multiple of the value corresponding to 90 degrees, or at the time when the rotation angle value is an integer multiple of 1024. In FIG. 12, the time points at which the estimated angle value is calculated are represented by black circles. The correction value calculation unit 155 calculates the correction value at each time point at which the estimated angle value is calculated. When comparing FIGS. 10 to 12, it can be found that the number of time points at which the correction value is calculated is further reduced in the high speed rotation as compared to that in the low speed rotation and medium speed rotation.

[Summary]

In the present embodiment, the interval control unit 157 controls the value of n according to the rotation speed for each rotation period. Because the interval control unit 517 changes the value of n according to the rotation speed, it is possible to change the number of time points at which the estimated angle value and the correction value are calculated and thus dynamically change the accuracy of the correction. For example, in the low speed operation that is significantly affected by acceleration, it is possible to obtain the estimated angle value and the correction value at smaller angle intervals by increasing the value of n. As a result, it is possible to improve the accuracy of the correction. On the other hand, in the high speed operation that is less affected by acceleration, the interval control unit 157 reduces the value of n to obtain the estimated angle value and the correction value at wider angle intervals. In this way, it is possible to reduce an excessive calculation.

Third Embodiment

Next, a third embodiment will be described. The configuration of a correction circuit used in the present embodiment can be the same as the configuration of the correction circuit used in the second embodiment shown in FIG. 9. The present embodiment controls the value of n according to the actual angle value output by the RDC 104, within one rotation period of the rotary shaft of the motor 200. For example, when the actual angle value is included in a certain angle range, the interval control unit 157 sets the value of n to n3. When the actual angle value is included in an angle range different from the certain angle range, the interval control unit 157 sets the value of n to n4 which is different from n3. In other respects, the correction circuit in the third embodiment may be the same as that in the first embodiment.

Here, the error included in the actual angle value changes depending on the rotation angle of the rotary shaft. The error may be large at a certain rotation angle while the error may be small at a different rotation angle. The interval control unit 157 monitors the error (the magnitude of the correction value) at each of the time points (rotation angles) at which the estimated angle value and the correction value are calculated, for example, over a plurality of periods, to check rotation angles, for example, with an error exceeding a predetermined threshold. In a predetermined range in which rotation angles with a large error are included, the interval control unit 157 increases the value of n to a value greater than that in other ranges, to allow the estimated angle value calculation unit 154 and the correction value calculation unit 155 to calculate the estimated angle value and the correction value in a smaller range.

Operation Example

Figure 13:
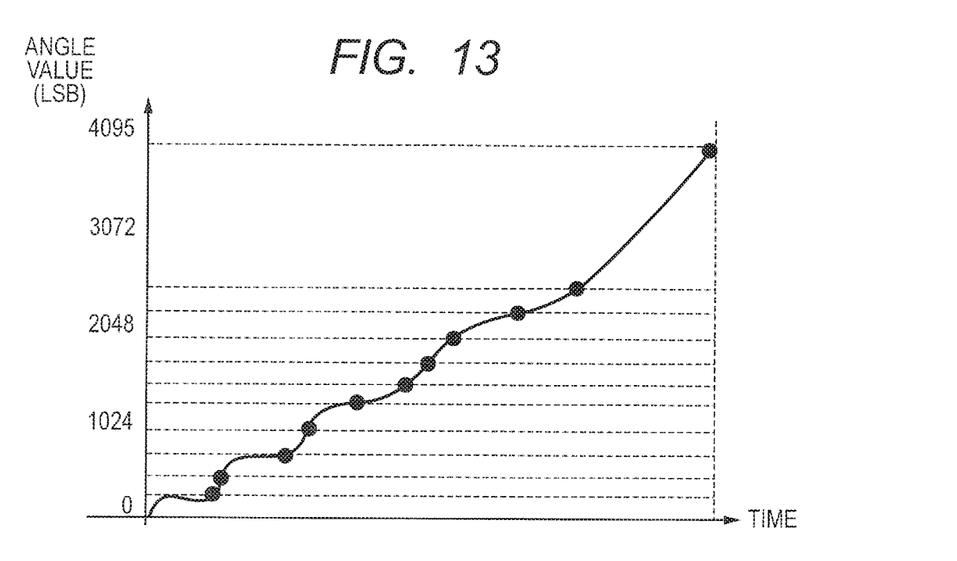
FIG. 13 is a graph showing an example of the interval for calculating the actual angle value and the estimated angle value in one rotation period.

FIG. 13 shows an example of the interval at which the actual angle value and the estimated angle value are calculated in one rotation period of the motor. In FIG. 13, the vertical axis represents the rotation angle value and the horizontal axis represents the time. Here, it is assumed, for example, that the error included in the actual value is large in the range of small rotation angle values and the error is small in the range of large rotation angle values.

The interval control unit 157 sets the value of n to "3" in the range of rotation angle values from 0 to 2560. Then, the interval control unit 157 sets the value of n to "4" in the range of rotation angle values from 2560 to 4095. In this case, in the range of rotation angle values from 0 to 2560, the estimated angle value and the correction value are calculated every rotation angle values 256. Further, in the range of rotation angle values from 2560 to 4095, the estimated angle value and the correction value are calculated every rotation angle values 1024. By performing such a control, it is possible to correct the actual angle value with high accuracy in a specific rotation angle range.

[Summary]

In the present embodiment, the interval control unit 157 controls the value of n within one rotation period. In this way, it is possible to change the interval at which the estimated angle value and the correction value are calculated, according to the actual angle value. For example, in the vicinity of the rotation angle whose error is large and thus whose correction accuracy is desired to be increased, it is possible to finely obtain the estimated angle value and the correction value by increasing the value of n. Further, in the range of the rotation angle whose error is small and thus for which high correction accuracy is not required, it is possible to roughly obtain the estimated angle value and the correction value by reducing the value of n.

In the first and second embodiments, the value of n is constant within one rotation period, so that the estimated angle value and the correction value can be obtained at uniform rotation angle intervals. In these embodiments, when the value of n is increased to increase the accuracy of the correction, the number of rotation angle values for calculating the estimated angle value and the correction value within one rotation period increases. On the other hand, in the present embodiment, it is possible to obtain the estimated angle value and the correction value at small rotation angle intervals in a specific rotation angle range, and obtain the estimated angle value and the correction value at wide rotation intervals in other rotation angle ranges. Thus, it is possible to correct the actual angle value with required correction accuracy, for example, while preventing an increase in the number of rotation angle values for calculating the estimated angle value and the correction value within one rotation period.

[Variation]

Note that the second and third embodiments have described an example in which the interval control unit 157 is included in the correction circuit 105a. However, the present invention is not limited to this example. It may also be possible that the microcontroller 106 (see FIG. 1), or the like, has the interval control unit 157, instead of the correction circuit 105a having the interval control unit 157. Further, each of the embodiments has described an example in which the semiconductor device 103 includes the RDC 104, but the present invention is not limited to this. The RDC 104 may be configured as a semiconductor device different from the semiconductor device in which the correction circuit 105 is included.

While the invention made by the present inventors has been concretely described based on the embodiments, the present invention is not limited to the embodiments described above. It goes without saying that various modifications and variations can be made without departing from the scope of the present invention.

For example, some or all of the above embodiments can also be described as the following notes, but are not limited to the following statements.

[Note 1]

An angle value correction circuit includes: a rotation period measurement unit that measures a rotation period of a rotary shaft in which a rotation angle is detected by a resolver that outputs a signal corresponding to the rotation angle of the rotary shaft; a rotation speed calculation unit that calculates the rotation speed of the rotary shaft based on the rotation period; an acceleration calculation unit that calculates the rate of change of the rotation speed per interval when a given rotation angle of the rotary shaft is divided into $2^{n+1}$ intervals, in which n is an integer of 1 or more, based on the rotation speed; an estimated angle value calculation unit that calculates the rotation angle estimation value which is the estimated value of the rotation angle of the rotary shaft, assuming that the rotary shaft performs a uniform acceleration motion, based on the rotation speed as well as the rate of change of the rotation speed; a correction value calculation unit that calculates the correction value of the rotation angle value, based on the rotation angle value converted from the output signal of the resolver as well as the rotation angle estimation value; and a correction value application unit that applies the correction value to the rotation angle value to generate a corrected angle value.

[Note 2]

In the angle value correction circuit described in Note 1, the estimated angle calculation unit calculates the rotation angle estimation value at the time point at which the rotation angle value is the value corresponding to an integer multiple of the angle obtained by dividing the given rotation angle by $2^{n+1}$.

[Note 3]

In the angle value correction circuit described in Note 2, the correction value calculation unit calculates the difference between the rotation angle value and the rotation angle estimation value, as the correction value at the time point at which the rotation angle value is the value corresponding to an integer multiple of the angle obtained by dividing the given rotation angle by $2^{n+1}$.

[Note 4]

In the angle value correction circuit described in Note 1, the rotation speed calculation unit calculates the rotation speed each time the rotary shaft rotates by the given rotation angle.

[Note 5]

In the angle value correction circuit described in Note 1, the given rotation angle is 360 degrees.

[Note 6]

In the angle value correction circuit described in Note 5, the acceleration calculation unit calculates the rate of change of the rotation speed, $a_i$, in the ith period by the following equation: $a_i=(V_i-V_{i-1})/2^{n+1}$, in which i is an integer of 2 or more that indicates the number of the rotation period corresponding to one rotation of the rotary shaft, $V_i$ is the rotation speed in the ith period, and $V_{i-1}$ is the rotation speed in the i−1th period.

[Note 7]

In the angle value correction circuit described in Note 6, the rotation speeds $V_i$ and $V_{i-1}$ are represented by the floating point format of a predetermined bit number. The acceleration calculation unit includes: a digit matching circuit that matches the exponent part of the rotation speed $V_i$ and the exponent part of the rotation speed $V_{i-1}$ with a common exponent, and outputs the mantissa of $V_i$ and the mantissa of $V_{i-1}$ when the exponent parts have the common exponent; a first subtractor that subtracts the mantissa of $V_{i-1}$ from the mantissa of $V_i$ when the exponent parts are made common; and a second subtractor that subtracts n+1 from the common exponent.

[Note 8]

In the angle value correction circuit described in Note 6, the estimated angle calculation unit calculates the rotation angle estimation value $Y_i(k)$ by the following equation: $Y_i(k)=V_i \times t_i(k)+(\frac{1}{2}) \times a_i \times t_i(k) \times (k-2^{n+1})$, in which k is an integer from 1 to 2n+1 corresponding to the number of the dividing interval and $t_i(k)$ is the value corresponding to the time required for the rotation angle value to reach the value corresponding to $(360°/2^{n+1}) \times k$ from the initial value in the ith period.

[Note 9]

In the angle value correction circuit described in Note 8, the correction value calculation unit calculates the correction value $S_i(k)$ at the time point at which the rotation angle value is the value corresponding to the rotation angle $(360°/2^{n+1}) \times k$ in the ith period, by the following equation: $S_i(k)=$ [the value corresponding to $(360°/2^{n+1}) \times k)]-Y_i(k)$.

[Note 10]

In the angle value correction circuit described in Note 9, the correction value $S_i(0)$ at the time point at which the rotation angle value is the value corresponding to the rotation angle 0° is defined as $S_i(0)=0$. The correction value application unit applies the correction value, which is generated based on the correction values $S_i(k-1)$ and $S_i(k)$, to the rotation angle value, from the time point at which the rotation angle value is the value corresponding to the rotation angle $(360°/2^{n+1}) \times (k-1)$ to the time point at which the rotation angle value is the value corresponding to the rotation angle $(360°/2^{n+1}) \times k$.

[Note 11]

In the angle value correction circuit described in Note 9, the correction value application unit generates the corrected angle value by applying the correction value $S_i(k)$ calculated in the ith period to the rotation angle value obtained in the i+1th period.

[Note 12]

In the angle value correction circuit described in Note 11, the correction value application unit does not apply the correction value until the correction value is calculated, after the start of the i+1th period, and starts applying the correction value when the correction value is calculated.

[Note 13]

The angle value correction circuit described in Note 1 further includes an interval control unit that controls the value of n.

[Note 14]

In the angle value correction circuit described in Note 13, the interval control unit controls the value of n according to the rotation speed for each rotation period of the rotary shaft.

[Note 15]

In the angle value correction circuit described in Note 14, the interval control unit sets the value of n to a first value when the rotation speed is a first speed, and sets the value of n to a second value that is smaller than the first value when the rotation speed is a second speed that is faster than the first speed.

[Note 16]

In the angle value correction circuit described in Note 13, the interval control unit controls the value of n according to the rotation angle value within one rotation period of the rotary shaft.

[Note 17]

In the angle value correction circuit described in Note 16, the internal control unit sets the value of n to a third value when the rotation angle value is included in a first range, and sets the value of n to a fourth value which is different from the third value when the rotation angle value is included in a second range which is different from the first range.

[Note 18]

A semiconductor device includes: an angle value converter that converts an output signal of a resolver that outputs a signal according to a rotation angle of a rotary shaft into a rotation angle value; and an angle value correction circuit that outputs a corrected angle value obtained by correcting the rotation angle value. The angle value correction circuit includes: a rotation period measurement unit that measures the rotation period of the rotary shaft; a rotation speed calculation unit that calculates the rotation speed of the rotary shaft based on the rotation period; an acceleration calculation unit that calculates the rotation speed per interval when a given rotation angle of the rotary shaft is divided into $2^{n+1}$ intervals, in which n is an integer of 1 or more, based on the rotation speed; an estimated angle calculation unit that calculates the rotation angle estimation value which is the estimated value of the rotation angle of the rotary shaft, assuming that the rotary shaft performs a uniform acceleration motion, based on the rotation speed as well as the rate of change of the rotation speed; a correction value calculation unit that calculates the correction value of the rotation angle value based the rotation angle value and the rotation angle estimation value; and a correction value application unit that applies the correction value to the rotation angle value to generate a corrected angle value.

[Note 19]

A motor control device includes: a resolver that outputs a signal corresponding to a rotation angle of a rotary shaft of a motor; an angle value converter that converts an output signal of the resolver into a rotation angle value; an angle value correction circuit that outputs a corrected angle value obtained by correcting the rotation angle value; and a motor drive control unit that rotationally drives the motor based on the rotation angle value. The angle value correction circuit includes: a rotation period measurement unit that measures the rotation period of the rotary shaft; a rotation speed calculation unit that calculates the rotation speed of the rotary shaft based on the rotation period; an acceleration calculation unit that calculates the rotation speed per interval when a given rotation angle of the rotary shaft is divided into $2^{n+1}$ intervals, in which n is an integer of 1 or more, based on the rotation speed; an estimated angle calculation unit that calculates the rotation angle estimation value which is the estimated value of the rotation angle of the rotary shaft, assuming that the rotary shaft performs a uniform acceleration motion, based on the rotation speed as well as the rate of change of the rotation speed; a correction value calculation unit that calculates the correction value of the rotation angle value based on the rotation angle value and the rotation angle estimation value; and a correction value application unit that applies the correction value to the rotation angle value to generate a corrected angle value.

[Note 20]

An angle value correction method includes the steps of: calculating the rotation speed of a rotary shaft in which a rotation angle is detected by using a resolver that outputs a signal according to the rotation angle of the rotary shaft; calculating the rate of change of the rotation speed per interval when a given rotation angle of the rotary shaft is divided into $2^{n+1}$ intervals, in which n is an integer of 1 or more, based on the rotation speed; calculating a rotation angle estimation value which is the estimated value of the rotation angle of the rotary shaft, assuming that the rotary shaft performs a uniform acceleration motion, based on the rotation speed as well as the rate of change of the rotation speed; calculating the correction value of the rotation angle value, based on the rotation angle value converted from the output signal of the resolver as well as the rotation angle estimation value; and applying the correction value to the rotation angle value to generate a corrected angle value.

What is claimed is:

1. An angle value correction circuit comprising:
   a rotation period measurement unit that measures a rotation period of a rotary shaft in which a rotation angle is detected by using a resolver that outputs a signal according to the rotation angle of the rotary shaft;
   a rotation speed calculation unit that calculates the rotation speed of the rotary shaft based on the rotation period;
   an acceleration calculation unit that calculates a rate of change of the rotation speed per interval when a given rotation angle of the rotary shaft is divided into $2^{n+1}$ intervals, in which n is an integer of 1 or more, based on the rotation speed;
   an estimated angle calculation unit that calculates a rotation angle estimation value which is an estimated value of the rotation angle of the rotary shaft, assuming that the rotary shaft performs a uniform acceleration motion, based on the rotation speed as well as the rate of change of the rotation speed;
   a correction value calculation unit that calculates a correction value of a rotation angle value based on a rotation angle value converted from the output signal of the resolver, as well as on the rotation angle estimation value; and
   a correction value application unit that applies the correction value to the rotation angle value to generate a corrected angle value,
   wherein the given rotation angle is 360 degrees,
   wherein the acceleration calculation unit calculates the rate of change of the rotation speed, ai, in an ith period by the following equation: $a_i=(V_i-V_{i-1})/2^{n+1}$, in which i is an integer of 2 or more that indicates a number of the rotation period corresponding to one rotation of the rotary shaft, $V_i$ is a rotation speed in the ith period, and $V_{i-1}$ is a rotation speed in an i-1th period,
   wherein the rotation speeds $V_i$ and $V_{i-1}$ are represented by a floating point format of a predetermined bit number, and
   wherein the acceleration calculation unit comprises:
      a digit matching circuit that matches an exponent part of $V_i$ and an exponent part of $V_{i-1}$ with a common exponent, and generates a mantissa of $V_i$ and a mantissa of $V_{i-1}$ when the exponent part of $V_i$ and the exponent part of $V_{i-1}$ have the common exponent;
      a first subtractor that subtracts the mantissa of $V_{i-1}$ from the mantissa of $V_i$ when the exponent part of $V_i$ and the exponent part of $V_{i-1}$ have the common exponent are made common; and
      a second subtractor that subtracts n+1 from the common exponent.

2. The angle value correction circuit according to claim 1, wherein the estimated angle calculation unit calculates the rotation angle estimation value at a time point at which the rotation angle value is a value corresponding to an integer multiple of the angle obtained by dividing the given rotation angle by $2^{n+1}$.

3. The angle value correction circuit according to claim 2, wherein the correction value calculation unit calculates a difference between the rotation angle value and the rotation angle estimation value as the correction value at the time point at which the rotation angle value is the value corresponding to an integer multiple of the angle obtained by diving a predetermine rotation angle by $2^{n+1}$.

4. The angle value correction circuit according to claim 1, wherein the rotation speed calculation unit calculates the rotation speed each time the rotary shaft rotates by the given rotation angle.

5. The angle value correction circuit according to claim 1, wherein the estimated angle calculation unit calculates a rotation angle estimation value $Y_i(k)$ at a time point at which a rotation angle value is a value corresponding to a rotation angle $(360°/2^{n+1})\times k$, by the following equation: $Y_i(k)=V_i\times t_i(k)+(½)\times a_i\times t_i(k)\times(k-2^{n+1})$, in which k is an integer from 1 to $2^{n+1}$ corresponding to a number of a dividing interval and $t_i(k)$ is a value corresponding to a time required for the rotation angle value to reach the value corresponding to $(360°/2^{n+1})\times k$ from an initial value in the ith period.

6. The angle value correction circuit according to claim 5, wherein the correction value calculation unit calculates a correction value $S_i(k)$ at the time point at which the rotation angle value is the value corresponding to the rotation angle $(360°/2^{n+1})\times k$, in the ith period, by the following equation: $S_i(k)=$[the value corresponding to $(360°/2^{n+1})\times k]-Y_i(k)$.

7. The angle value correction circuit according to claim 6, wherein a correction value $S_i(0)$ at a time point at which the rotation angle value is a value corresponding to the rotation angle 0° is defined as $S_i(0)=0$, and
   wherein the correction value application unit applies the correction value, which is generated based on correction values $S_i(k-1)$ and $S_i(k)$, to the rotation angle value from the time point at which the rotation angle value is the value corresponding to a rotation angle $(360°/2^{n+1})\times(k-1)$ to the time point at which the rotation angle value is the value corresponding to the rotation angle $(360°/2^{n+1})\times k$.

8. The angle value correction circuit according to claim 6, wherein the correction value application unit generates the corrected angle value by applying the correction value $S_i(k)$ calculated in the ith period to the rotation angle value obtained in the i+1th period.

9. The angle value correction circuit according to claim 8, wherein the correction value application unit does not apply the correction value until the correction value is calculated, after the start of the i+1th period, and starts applying the correction value when the correction value is calculated.

10. The angle value correction circuit according to claim 1, further comprising an interval control unit that controls the value of n.

11. The angle value correction circuit according to claim 10, wherein the interval control unit controls the value of n according to the rotation speed for each rotation period of the rotary shaft.

12. The angle value correction circuit according to claim 11, wherein the interval control unit sets the value of n to a first value when the rotation speed is a first speed, and sets the value of n to a second value that is smaller than the first value when the rotation speed is a second speed that is faster than the first speed.

13. The angle value correction circuit according to claim 10, wherein the interval control unit controls the value of n according to the rotation angle value within one rotation period of the rotary shaft.

14. The angle value correction circuit according to claim 13, wherein the interval control unit sets the value of n to a third value when the rotation angle value is included in a first range, and sets the value of n to a fourth value that is different from the third value when the rotation angle value is included in a second range that is different from the first range.

15. A semiconductor device comprising:
an angle value converter that converts an output signal of a resolver that outputs a signal according to a rotation angle of a rotary shaft; and
an angle value correction circuit that outputs a corrected angle value obtained by correcting a rotation angle value,
wherein the angle value correction circuit comprises:
a rotation period measurement unit that measures a rotation period of the rotary shaft;
a rotation speed calculation unit that calculates a rotation speed of the rotary shaft based on the rotation period;
an acceleration calculation unit that calculates a rate of change of the rotation speed per interval when a given rotation angle of the rotary shaft is divided into $2^{n+1}$ intervals, in which n is an integer of 1 or more, based on the rotation speed;
an estimated angle calculation unit that calculates a rotation angle estimation value which is an estimated value of the rotation angle of the rotary shaft, assuming that the rotary shaft performs a uniform acceleration motion, based on the rotation speed as well as the rate of change of the rotation speed;
a correction value calculation unit that calculates correction value of the rotation angle value based on the rotation angle value and the rotation angle estimation value; and
a correction value application unit that generates a corrected angle value by applying the correction value to the rotation angle value,
wherein the given rotation angle is 360 degrees,
wherein the acceleration calculation unit calculates a rate of change of a rotation speed, ai, in an ith period by the following equation: $a_i=(V_i-V_{i-1})/2^{n+1}$, in which i is an integer of 2 or more that indicates a number of the rotation period corresponding to one rotation of the rotary shaft, $V_i$ is a rotation speed in the ith period, and $V_{i-1}$ is a rotation speed in an i−1th period,
wherein the rotation speeds $V_i$ and $V_{i-1}$ are represented by a floating point format of a predetermined bit number, and
wherein the acceleration calculation unit comprises:
a digit matching circuit that matches an exponent part of $V_i$ and an exponent part of $V_{i-1}$ with a common exponent, and generates a mantissa of $V_i$ and a mantissa of $V_{i-1}$ when the exponent part of $V_i$ and the exponent part of $V_{i-1}$ have the common exponent;
a first subtractor that subtracts the mantissa of $V_{i-1}$ from the mantissa of $V_i$ when the exponent part of $V_i$ and the exponent part of $V_{i-1}$ have the common exponent are made common; and
a second subtractor that subtracts n+1 from the common exponent.

16. An angle value correction method comprising the steps of:
calculating a rotation speed of a rotary shaft in which a rotation angle is detected by a resolver that outputs a signal according to a rotation angle of the rotary shaft;
calculating a rate of change of the rotation speed per interval when a given rotation angle of the rotary shaft is divided into $2^{n+1}$ intervals, in which n is an integer of 1 or more, based on the rotation speed;
calculating a rotation angle estimation value which is an estimated value of the rotation angle of the rotary shaft, assuming that the rotary shaft performs a uniform acceleration motion, based on the rotation speed as well as the rate of change of the rotation speed;
calculating a correction value of a rotation angle value based on a rotation angle value converted from the output signal of the resolver as well as on a rotation angel estimated value; and
generating a corrected angle value by applying the correction value to the rotation angle value,
wherein the given rotation angle is 360 degrees,
wherein a rate of change of a rotation speed, ai, in an ith period is calculated by the following equation: $a_i=(V_i-V_{i-1})/2^{n+1}$, in which i is an integer of 2 or more that indicates a number of a rotation period corresponding to one rotation of the rotary shaft, $V_i$ is a rotation speed in the ith period, and $V_{i-1}$ is a rotation speed in an i−1th period,
wherein the rotation speeds $V_i$ and $V_{i-1}$ are represented by a floating point format of a predetermined bit number, and
wherein an exponent part of $V_i$ and an exponent part of $V_{i-1}$ are matched with a common exponent,
wherein a mantissa of $V_i$ and a mantissa of $V_{i-1}$ are generated when the exponent part of $V_i$ and the exponent part of $V_{i-1}$ have the common exponent;
wherein the mantissa of $V_{i-1}$ is subtracted from the mantissa of $V_i$ when the exponent part of $V_i$ and the exponent part of $V_{i-1}$ have the common exponent are made common; and
wherein n+1 is subtracted from the common exponent.

* * * * *